United States Patent [19]

Yount et al.

[11] 4,065,659

[45] Dec. 27, 1977

[54] FOOD PROCESSING OVEN

[75] Inventors: Ronald E. Yount, Boonville; Robert A. Bell, Columbia, both of Mo.

[73] Assignee: McGraw-Edison Company, Elgin, Ill.

[21] Appl. No.: 647,875

[22] Filed: Jan. 9, 1976

[51] Int. Cl.² .............................................. F27D 11/02
[52] U.S. Cl. .................. 219/398; 99/329 R; 219/397; 219/408; 219/413; 219/488
[58] Field of Search ............... 219/395, 396, 397, 398, 219/403, 408, 410, 411, 412, 413, 488; 99/327, 328, 329 R

[56] References Cited

U.S. PATENT DOCUMENTS

| | | | |
|---|---|---|---|
| 2,035,767 | 3/1936 | Schulze | 219/398 |
| 2,276,930 | 3/1942 | Clark | 219/398 |
| 2,388,839 | 11/1945 | Fry | 219/398 |
| 2,668,221 | 2/1954 | McCormick | 219/398 |
| 2,705,276 | 3/1955 | Wise | 219/488 |
| 2,778,914 | 1/1957 | Vallorani | 219/397 |
| 2,790,056 | 4/1957 | Fry | 219/398 |
| 3,578,949 | 5/1971 | Weyrick | 219/403 |
| 3,626,155 | 12/1971 | Joeckel | 219/398 X |
| 3,731,039 | 5/1973 | Beech | 219/395 X |

*Primary Examiner*—Volodymyr Y. Mayewsky
*Attorney, Agent, or Firm*—Ronald J. LaPorte; Charles F. Lind; Jon Carl Gealow

[57] ABSTRACT

The disclosed cooking device has a cooking cavity with an access opening and a door for closing same, and has a rack in the cavity to support the food to be cooked. The device has electric heating elements in the cavity, and control means that energize the heating elements approximately 10 to 45% of potential high level heat outputs thereof. The total power input of the low level energized heating elements is in the range of 15 to 30% maximum and thus provides heating of air in the cavity only to within the range of 220° to 300° F maximum, without food load, and at a low rate so that the cavity air temperature generally will only exceed the temperature of the food by 20° to 50° F aproximately during a sustained cooking cycle. This low temperature method of cooking does not require personal tending to the food and minimizes the chances of burning the food. Also different foods held in separate containers can be cooked simultaneously with this method for the same duration cook cycle while yet maintaining the individual taste characteristics of each food. The cook cycle is slow and requires generally a minimum duration of approximately 5 or 6 hours and tolerates a maximum duration of approximately 12 to 20 hours.

The same or different heating elements can be energized at the high level outputs for providing conventional broiling or baking food cooking cycles.

12 Claims, 4 Drawing Figures

U.S. Patent    Dec. 27, 1977    4,065,659
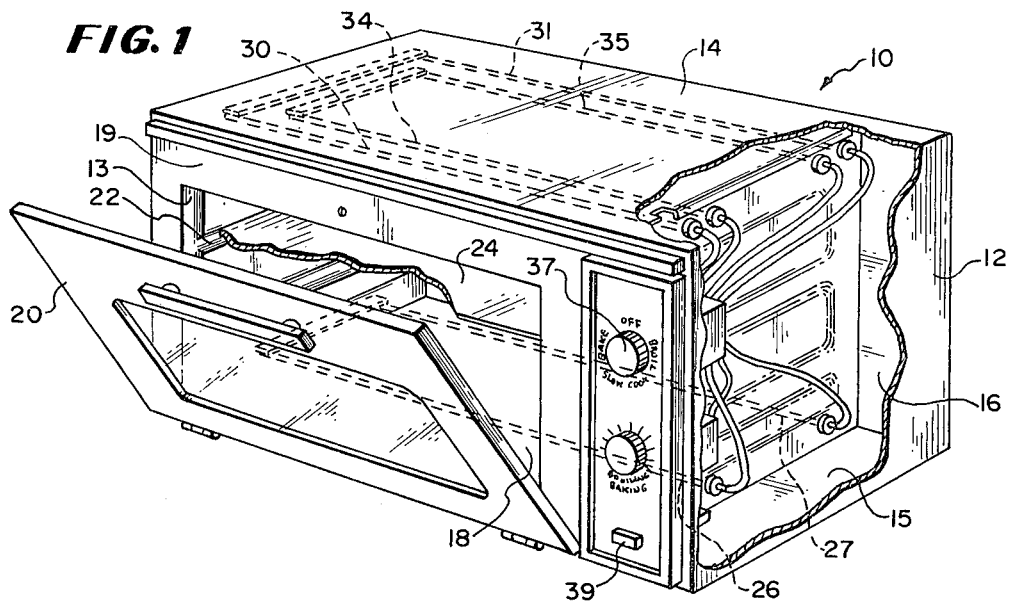
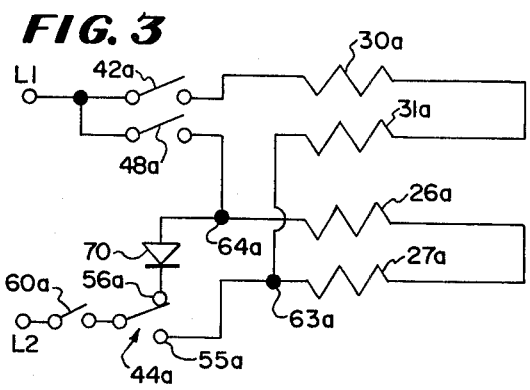
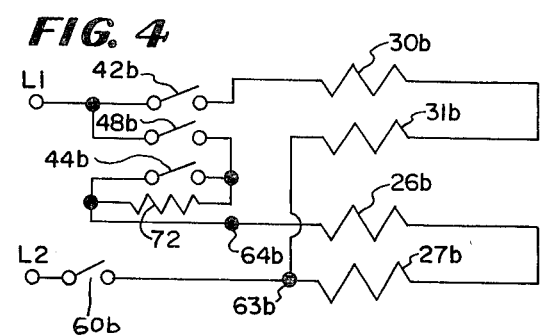

FOOD PROCESSING OVEN

BACKGROUND OF THE INVENTION

Present known multiple purpose cooking devices of the broiler-oven type typically have case structure defining a front open cavity and a door for closing the cavity, and heating elements in the cavity can be energized selectively for broiling or for baking food in the cavity. However, each of these known devices, on a commercial basis, requires personal care in observing or tending to the food, or requires timing or thermostatic controls to minimize overcooking of the food or of even damaging the food and creating a safety fire hazard.

There further are liquid tight vessel type cooking devices which steam or stew the food in water or other liquid and in the foods own juices. This type cooker allows for the mixing of differing foods, and the result is a stew or a soup with generally comingled flavors. Cookers of this type also operate for a slow cook cycle, requiring a minimum cooking span in excess of perhaps five to six hours and tolerating a maximum cooking span of ten to twelve hours, and generally without overcooking and/or significant loss in the taste of the food, and without necessary personal attention. However, the convenience factor of allowing unattended cooking frequently, in time at least, looses out to conventional broiler or oven type cooking because of the sameness of taste and appearance and/or because of the comingled stew like character of food cooked in such a unit.

Cooking units of the type mentioned above are illustrated in the: Smith et al. U.S. Pat. No. 2,103,560; the Smith U.S. Pat. No. 2,048,572; the Meyer U.S. Pat. No. 2,138,706; The Crease et al. U.S. Pat. No. 3,159,094; the Kramer U.S. Pat. No. 3,522,414; and the Young et al. U.S. Pat. No. 3,585,360.

SUMMARY OF THE INVENTION

This invention teaches a combination broiler oven type cooking device having a cooking cavity with heating elements appropriately located therein which elements can be energized for broiling or baking food in the cavity. The device additionally has heating elements appropriately located in the cavity which can be energized to slow cook food in the cavity. Under the slow cook mode of cooking, the energized heating elements operate only at low level heat outputs and preferably on a continuous basis and serve to increase the temperature of the cavity air only to within a maximum range of 220° to 300° F even after sustained operation without a food load and generally further at such a low rate that the temperature of the cavity air does not exceed the temperature of the food during the cook cycle by more than 20° to 50° F. The food in the cavity thus is gradually heated with air only slightly warmer than the food itself, and without being subjected to rapid blasts of heat, to a cooked temperature in excess of 125° F and preferably in a range between 125° F and 212° F after a cooking cycle lasting a minimum of 5 to 6 hours and a maximum of 12 to 20 hours.

BRIEF DESCRIPTION OF THE DRAWINGS

FIG. 1 is a perspective view, partly broken away and in section, of a preferred embodiment of a cooking device incorporating the subject invention; and FIG. 2 is an electric schematic showing a preferred mode of control and operation of the subject invention as disclosed in FIG. 1; and FIGS. 3 and 4 are electric schematics of alternate embodiments of control and operation of the subject invention.

DETAILED DESCRIPTION OF THE INVENTION

FIG. 1 illustrates a broiler-oven device 10 within which the subject invention is to be disclosed. The device 10 has a case including opposed end walls 12 and 13, top wall 14, bottom wall 15, and rear wall 16, respectively meeting across interior corners to define a cooking cavity 18 open at the front case wall 19, and a door 20 cooperates with the front case wall to selectively open or close the cavity 18. Opposed ledges 22 formed in the end walls are suited for holding a rack or shelf 24 at vertically adjusted positions within the cavity.

The cooking device illustrated is electrically operated and thus bottom heating elements 26 and 27 extend between the end walls 12 and 13 in closely adjacent but spaced relation to the bottom wall 15, and first top heating elements 30 and 31 and second top heating elements 34 and 35 likewise extend between the end walls 12 and 13 but in closely adjacent spaced relation to the top wall 14. The heating elements as paired above preferably are located symmetrically front to rear of the center of the cavity.

A conventional flexible electric cord (not shown) having a plug that can be removably connected to a typical wall outlet is brought to within the device as hot input power lines L1 and L2 shown in the control schematic. A switch 37 is used to connect the input lines to the respective heating elements in the manner to be explained for controlling the operating cycles of the device. Pilot light 39 on the case indicates when the unit is operating, regardless of the cycle.

The case can be of a double walled construction and/or can have insulation in the walls to help retain the heat in the cooking cavity 18 and further to help keep the exterior case walls cool. The mountings of the heating elements in the case can be typical, although the specific heating elements are preferably of the electrically insulated or sheathed type. The door hinging arrangement preferably should be capable of having the door closed, cracked open, or fully open. Different racks can be used, for example, of an open or laticed wire structure or of a dished liquid tight pan to collect the drippings of food cooked in the device.

Referring now to the schematic, the switch 37 has various sets 40, 42, 44, and 48 of switch contacts each of which is independently controlled according to the operational cycle of the device, that is "off", in the "broil" condition, in the "bake" condition, or in the "slow cook" position. Specifically, the switch set 40 has contacts 50 and 51, the switch set 42 has contacts 52 and 53, the switch set 44 has a common contact 54 and two spaced contacts 55 and 56 which the common contact 54 can separately make contact with, and switch set 48 has contacts 58 and 59. A thermostat 60 is likewise illustrated in the circuit.

Regarding the specifics in the "off" operative position of the switch 37, the actuator elements (not shown) allow for the opening of each set of the switch contacts so that there is no electrical connection made across the input power lines L1 and L2 and the heating elements, which thus remain deenergized.

In the "broil" operative position of the switch, the switch set 40 is closed to energize the pilot 39 and indicate that the cooking device is operating. Likewise the switch set 42 is closed to complete a circuit from L1 across the closed switch contacts 52 and 53 and through the broil elements 30 and 31 to the common connector point 63 of the circuit and across the thermostat 60 to the L2. Consequently, full voltage is applied to the broil heating elements 30 and 31. The other switch sets 44 and 48 are open.

In the "bake" operative position, the switch set 40 is again closed to energize the pilot 39. The switch set 42 is open and thus the upper broil elements 30 and 31 are deenergized. The switch set 44 is shifted where common contact 54 is closed against contact 56, and the switch set 48 is likewise closed. This connects line L1 across the closed switch contacts 58 and 59 to connection 64 and from there through both the lower bake elements 26 and 27 and upper bake elements 34 and 35 in a parallel hookup to connection 63 and across the closed switch contacts 54 and 56 through the thermostat switch contacts 60 to L2. Thus the upper brake elements 34 and 35 and lower bake elements 26 and 27 are subjected to the full line voltage and thus operates at full power outputs.

In the "slow cook" operative setting, the contact set 40 again is closed to energize the pilot 39; contact set 42 is open to provide that the broiling elements 30 and 31 are deenergized; and contact set 48 is open to separate the circuit juncture 64 from the power line L1. However, the switch set 44 is shifted so that the common contact 54 is closed against contact 55 to thereby connect L1 through the closed contacts 54 and 55 to the upper bake elements 35 and 34 and in series then also with the lower bake elements 26 and 27 and the thermostat switch 60 to L2. The series hookup between the bake elements 25 and 26, and 34 and 35 provides that the total wattage output is reduced to within the range of 15 to 30 percent of the total rated output of the heating elements on the bake cycle.

It is noted in actual fabrication of the disclosed device and specifically the construction of the heating elements, that each pair of heating elements is comprised of two separate heating elements connected in series with one another by means of a bus bar construction or the like, as is typical in the art.

It is noted also that the construction of the control switch 37 is typical, where separate cams (not shown) shifted by a single manually moved knob actuate the individual switch sets according to the desired disclosed operative setting thereof for the specific cooking cycle. See Simmons et al. U.S. Pat. No. 3,737,595.

In each of the broil, bake, and the slow cook cycles, the thermostat 60 is located in heat sensing relation to the cooking cavity air. In general practice, the door 20 of the unit is closed during the bake and slow cook cycles; whereas it is preferably left ajar during the broiling cycle. Consequently, during baking where the heating elements are being energized to their full rated outputs, the thermostat will cycle the heating elements on and off; whereas during the broiling cycle with the door ajar and during the slow cook cycle even with the door closed, the cavity air generally is not heated sufficiently to activate the thermostat and cycle the heating elements.

OPERATION OF THE INVENTION

The preferred construction of the device provides for its use on conventional 15 or 20 ampere 115 volt AC domestic service, where the energized heating elements would produce only approximately 1200 to 1400 watts, and would not exceed approximately 1600 to 1800 watts. Consequently, when the device is used for broiling and/or for baking, the energy output levels of the respective energized heating elements would preferably not exceed these general guideline figures, and the description of the operation assumes 1200 watts as the maximum output level. The disclosed broiling heating elements thus would each operate at 600 watts at a 60 volt AC potential; whereas the upper bake elements 34 and 35 would each operate a 200 watts at 60 volt AC potential; and the lower bake elements would each operate at 400 watts at 60 volt AC potential.

Regarding the cycles, during the broil cycle, only the top heating elements 30 and 31 are energized and the same might be rated at 1200 watts for example at 120 volt AC power input.

During the bake cycle, the bottom heating elements 26 and 27 alone might be energized at the full rated wattage of 1200 at 120 volt AC power input, but preferably however, both the bottom heating elements 26 and 27 and the upper heating elements 34 and 35 are energized at a total output of approximately 1200 watts. It has been found desirable to have the lower bake elements 26 and 27 comprise approximately twice the rated output of the upper bake element 34 and 35, so that with a 1200 watts system, the lower bake elements operate at 800 watts and the upper bake elements 34 and 35 operate at approximately 400 watts. This use of both the upper and lower heating elements on the bake cycle has been found quite advantageous in providing better browning of the product being baked.

During the slow cook cycle, the top bake elements 34 and 35 and the bottom bake elements 26 and 27 are connected in series with each other to reduce the effective voltage input across each of the heating elements. In fact, with a 120 volt AC input, the effective rated output wattage of the heating elements in the series connection is approximately 267 or only slightly more than 25% of the full rated output.

With the heating elements energized in this partial output manner, the operating temperatures of the heating elements are substantially cooler than the operating temperatures of the full output energized elements. In other words, the heating elements at full wattage outputs would typically have surface temperatures in excess of 800°-900° F and more commonly even in the range between 1200°-1800° F, depending on the cooling effect that would take place because of air circulation around them and on the watt density design of such elements. The operating surface temperatures of the partially energized heating elements during the slow cook cycle are in the range between 250° F and 500° F. This means that during the slow cook cycle, the heating of the air within the cooking cavity is appreciably diminished, as compared to the bake cycle, so that with ambient losses from the cooking cavity the maximum air temperature within the cavity, even during sustained operation of the partially energized heating elements, typically does not exceed 220°-300° F.

Even though the thermostat switch contacts 60 typically would not even be opened in the slow cook cycle, since the low temperature setting on the thermostat would typically never be reached, the existence of the thermostat 60 provides for increased safety of the cooking device, and further satisfies the operating characteristics commonly required in electric cooking appliances of the subject type by Underwriter's Laboratories, Inc.

or other common regulatory agencies which exert significant influence over the industry.

Because the partially energized heating elements only reach a moderate temperature of the order of 250°-500° F, they are yet well within the black range of operation and thus have little if any radiation of infrared heat to minimize food browning. The low temperature heating elements further tend to heat air within the cooking cavity at a very modest rate so that the cavity air temperature beginning approximately at the room temperature or even lower is only gradually heated until it reaches its maximum, and that is at or nearly at the end of the cooking cycle. The heating rate of the food is continuous and thereby the temperature is gradually increased for the entire duration of the cooking cycle.

It has been found that the cooking cycle must extend a minimum of generally in excess of 5-6 hours, and possibly up to a maximum of 12-20 hours. With this cooking method, the disclosed cooking device operates to produce palatable and tasty foods, regardless almost of the particular food in question. Moreover, the disclosed cooking device accommodates the simultaneous cooking during a single slow cook cycle of entirely separate and seemingly noncompatible foods which might comprise a multiple course meal.

As noted, the disclosed slow cook process operates with relatively cool air temperatures in the cavity, even with sustained operation, and typically the maximum temperature of the air is only reached at the end of the cooking cycle. During the majority of the time on the slow cook cycle, the cavity air temperature is well below normal cooking temperatures and may only exceed the actual temperature of the food at that time by only 20° to 50° F, since the cooler food absorbs the heat of the air and the low output heating elements only adds the heat back to the air at a very slow rate. The input power to the cooking cavity with the case construction disclosed herein has been found to be approximately 25% of that required for the normal bake input power condition for the unit, where the ambient losses by convection and heat radiation from the case provide the desired maximum no load cavity air temperatures generally in the noted range and certainly less than 300° F. The size of the cooking cavity as well as the effective heat loss from the case might vary this, but the generally expected range of partially energized heating elements for the preferred slow cook cycle would be 10 to 30% of the full rated maximum.

In further regard, it is preferred that the slow cook process operate in such a manner that the energy input to the heating elements be on a continuous basis so that the heat addition to the cooking cavity be likewise on a continuous basis. This would mean for example, that the air in the cooking cavity would start at room temperature or even lower with a refrigerated food and would gradually be raised throughout the course of time by the partially energized heating element, which in turn would uniformly and slowly raise the temperature of the food disposed in the cooking cavity. The maximum temperature of the cooking cavity air, even with no food in the device, is far below the normal cooking temperatures on conventional bake cycles, and typically as noted above during an actual slow cook cycle probably never exceeds the actual food temperature by 20° to 50° F. As noted, even with the continuous operation of the heating elements, the typical slow cook cycle would last at least 5 to 6 hours and possibly even up to 12 to 20 hours.

It further should be noted that in normal use of the slow cook cycle, the food generally would be enclosed such as by being wrapped in a foil or by being held in a liquid tight covered vessel if the food is to be cooked in juices. A roast or a fowl could be slow cooked open or could be enclosed for example under a foil tent. Potatoes can be foil wrapped or not. Stews or casseroles preferably are covered.

The interesting aspect of the subject device and process is that where each of the foods is maintained separated from one another in separate containers, it will maintain its individual taste and can be served individually. Also, even though the foods might differ in normal expected cooking times, each can be placed in the device at the same time and can be removed at the same time and be subjected to the same slow cook cooking span, and each will be cooked in most delectable manner. The cooking time required far exceeds that normally required for the conventional temperature cooking, being in the range between 5 and 20 hours, depending on the mass of food and the latent heat of the food involved. With the heating elements only energized to approximately 10 to 30% of full heating capacity, but on a continuous basis, the low wattage input and low surface temperature of the order of 200° F to 500° F result in only a slow build-up of air temperature in the cavity, and with little if any infrared radiation commonly associated with cherry red heated surface temperatures. The continuous delivery of input power is preferred versus a similar total input of power cycled on or off which creates rapid blasts of heat from the heating elements.

The disclosed device further need not be watched during the slow cycle since the cavity air temperatures is so low and there is little or no likelihood of damaging the food and/or of damaging the environment.

By way of example, a double wall non-insulated case having approximate cavity dimensions of 15" wide by 8" high by 10" deep and a non-sealing door operates most satisfactorily according to the disclosed slow cook process with a power input of approximately 250 watts. It would be anticipated that the corresponding wattage required would increase and decrease relative to this for respectively larger or smaller cavities, or depending on the heat loss from the cooking cavity by variations in wall insulations and door seals.

Another significant point to note in the preferred embodiment is that the effective output of the heating elements is different for the bake and slow cook cycles. When the bake cycle operates elements 26 and 27, and 34 and 35 in parallel, the upper elements have a rated 400 watt high level output and the lower elements have a 800 watt high level output. However, when the same elements are connected in series, the total output of the entire element configuration is 267 watts, approximately, while the lower elements only produce approximately 90 watts of this and the upper elements produce approximately 177 watts of this. Consequently, the upper elements on the slow cook cycle are energized to a low level output of approximately 45% of the rated high level while the lower elements are energized to only approximately 10% of the high level output thereof. This, coupled with the positioning of the elements applies both the 10 to 30% low heat required for the desired slow cook cycle as compared to the bake cycle, but also provides that the warmer elements are located at the top of the cavity and thus serve as slow cook browning elements but on a much reduced level as compared to the bake cycle.

First Alternate Embodiment of the Invention

Various alternate embodiments of the invention are disclosed in schematic form in FIGS. 3 and 4. The like components are numbered in similar fashion to the components already disclosed in the preferred embodiment, followed however by a suffix letter "a" or "b".

Specifically, FIG. 3 shows a pair of upper broil elements 30a and 31a and a pair of lower bake elements 26a and 27a where each of these elements is rated at 600 watt at 60 cycle AC input voltage and the elements are connected in a series connection to give therefore the normal output of 1200 watts, according to the previously accepted criteria. In like manner, the power inputs at L1 and L2 are connected through a switch having switch sets 42a, 44a, and 48a to the heating elements. In like manner, a thermostat 60a is shown in a series connection with the input line L2.

In the "broil" mode of operation, the switch set 42a is closed, the switch set 48a is open, and the switch set 44a is closed against contact 55a. In this mode of operation, there is a series circuit connected through the broil heating elements 30a and 31a by means of the closed switch sets 42a and 44a via 55a through the connection 63a. The full input power is thus applied to the broil elements for the maximum 1200 watt rated output.

During the "bake" cycle, the switch set 42a is open, the switch set 48a is closed, and the switch set 44a is closed against contact 55a. In this mode of operation, the full rated input power is connected across the closed switch set 48a to connection 64a and in series through the lower bake elements 26a and 27a and across the closed contact 55a of the switch set 44a.

During the slow cook operation, the switch set 42a is closed while the switch set 48a is open and likewise the switch set 44a is closed but against contact 56a. In this regard a diode 70 is positioned in a circuit between the contact 56a and the common connection 64a. This circuitry thus connects L1 across the closed switch set 42a in series through the upper broil elements 30a an 31a to connection 63a and then in turn in series through the lower bake elements 27a and 26a to connection 64a and through the diode 70 and across contact 56a of the shifted switch set 42a and through the thermostat 68 to the line L2. The diode 70 in the series connection with these heating elements provides again a rated output of approximately 25% of the full rated output of either the broil or bake cycles when the elements are energized to their maximum.

It would be possible to add a suitable resistor in series with the diode 70 to cut the effective output of the heating elements further if desired to reach the lower ends of the expected 10 to 30% range of maximum output for successful operation of the slow cook cycle. Again, the thermostat 60a is connected in the circuit with the heating elements and will cycle the heating elements on and off should the set minimum temperature of the thermostat 60a be exceeded; but it is unlikely that the thermostat will ever cycle during the normal slow cook cycle where the heat input to the cavity is sufficiently low to minimize the buildup of heat.

Second Alternate Embodiment of the Invention

FIG. 4 in like manner shows another alternate embodiment very similar to that illustrated as the first alternate embodiment in FIG. 3 and again with similar terms identified in the like manner except for the suffix "b". In this circuit, there is a resistor 72 in a parallel connection across the switch set 44b.

The mode of operation of the unit is very similar wherein the broil control phase of the cycle, the switch set 42b is closed and the two switch sets 48b and 44b are open and accordingly the full voltage from input L1 is applied in a series connection through the top broil elements 30b and 31b to connection 63b and through the thermostat 60b to power line L2. With the heating elements 30b and 31b being of the proper input wattage, for example 600 watts at a 60 volt AC input, in a series connection of same the operating broiling output would be the 1200 watts desired.

For the bake cycle, the switch set 42b is open, and the switch sets 48b and 44b are closed, to the end that a connection is made from input line L1 across the closed switch sets 48b and 44b to and through the lower bake elements 26b and 27b and the thermostat 60b to line L2. This connection provides for full input power again to the lower bake elements, which form a 1200 watt system at 60 volt AC input voltage through the series connection of these 600 watt, 60 volt AC heating elements.

During the slow cook cycle, the switch set 42b is open, the switch set 44b is likewise open, and the switch set 84b is closed, to the end that the circuit is complete from the input line L1 across the closed switch set 48b through the resistor 72 to the bake heating elements 26b and 27b and on through the thermostat 60b to the power line L2. The resistance of the resistor 72 in the series connection with the lower heating elements 26b and 27b is determinitive of the heating effect and total wattage of the bake elements, and thus is designed to reduce the effective output from the heating elements to within the 10 to 30% expected range of maximum.

It should be noted that the alternate embodiments described show the use of a diode in one embodiment and the use of a resistor in the other embodiment. However, it would be possible to interchange these power reducing means and locate for example a resistor in place of the diode 70 and likewise to locate a diode in place of the resistor 72, so that with proper manipulation of the relative values of these components the heating element output is cut thereby to provide only approximately 10 to 30% of the total maximum rated power thereof.

It is possible also as an alternate embodiment to provide a separate heating element in the cavity of low output operating temperatures and also of low output wattage. However, since high temperature heating elements brown the food, even though the air temperature in the cooking cavity might be maintained within the desired operating range, the use of such elements again is not preferred.

What is claimed is:

1. A food processing oven including in combination:
a heat retaining enclosure having upper, lower, side and end walls defining a cooking cavity, one of said end walls defining an access opening into said cavity, a door mounted on said one end wall for movement between open and closed positions with respect to said access opening,
electrically operated heating element means mounted within said cavity for heating the interior thereof,
means provided in said cavity in spaced relation with said heating element means for supporting food to be cooked in said cavity, circuit means coupled to a source of power and to said heating element means for energization of the latter to heat said cooking cavity, thermostat means coupled to said circuit means and disposed for monitoring the temperature within said cavity thereby to maintain said cavity temperature below a preselected temperature level, and control means coupled to said circuit means and operable to a first mode for energizing said heating element means at full rated power output, said thermostat means being operable in said first mode for energizing and deenergizing said heating element means thereby to maintain said cavity temperature below said preselected temperature level, and to a second mode for energizing said heating element means at a reduced power output within the range of 10–30 percent of the full rated power output, said thermostat means being inactive in said second mode so that heating element means is energized continuously thereby to gradually increase the temperature in said cavity at a generally steady rate to within a predetermined temperature range of 220°–300° F.

2. A food processing oven as claimed in claim 1 wherein said heating element means includes first and second heating elements and wherein said control means comprises selector switch means including switch contact means, said switch contact means being connectable in a first manner in response to the operation of said selector switch means to a first position, whereby said heating elements are connected in parallel relation for energization at full rated power output and said switch contact means being connectable in a second manner in response to the operation of said switch contact means to said second mode, whereby said heating elements are connected in series relation for energization at 10–30 percent of the full rated power output.

3. A food processing oven as claimed in claim 2 wherein one of said first and second heating elements has a full power output rating twice as large as the other of said heating elements.

4. A food processing oven as claimed in claim 3 wherein the full power output rating of said first heating element is approximately 400 watts and the full power output rating of said second heating element is approximately 800 watts.

5. A food processing oven as claimed in claim 2 further including a third heating element connected to said circuit means and wherein said selector switch means is operable to a third position for energizing only said third heating element at full rated power output.

6. A food processing oven as claimed in claim 1 further including power reduction means coupled to said circuit means, wherein said power reduction means is connectable in series relation with said heating element means in response to the operation of said control means to said second mode whereby said power output of said heating element means is reduced to within 10–30 percent of full rated power output, said power reduction means being maintained inactive when said control means is operated to said first mode.

7. A food processing oven as claimed in claim 6 wherein said power reduction means includes a diode connectable in series with said heating element means.

8. A food processing oven as claimed in claim 7 wherein said power reduction means includes a resistor connectable in series with said heating element means.

9. A food processing oven including in combination:
a heat retaining enclosure having upper, lower, side and end walls defining a cooking cavity, one of said end walls defining an access opening into said cavity, a door mounted on said one end wall for movement between open and closed positions with respect to said access opening, first and second electrically operated heating element means each having a predetermined rated power output, mounted within said cavity for heating the interior thereof, means provided in said cavity in spaced relation with said first and second heating element means for supporting food to be cooked in said oven, circuit means coupled to a source of power and to said first and second heating element means for energization of the latter to heat said cooking cavity, thermostat means coupled to said circuit means and disposed for monitoring the temperature within said cavity thereby to maintain said cavity temperature below a preselected temperature level, and control means coupled to said circuit means and operable to a first mode for energizing both said first and second heating element means at said predetermined rate power output, said thermostat means being operable in said first mode for energizing and deenergizing said first and second heating element means to maintain said cavity temperature below said preselected temperature level, and to a second mode of operation for energizing said first and second heating element means at a reduced power output within the range of 10–30 percent of said predetermined rated power output, said thermostat being inactive in said second mode so that said first and second heating element means are energized continuously thereby to gradually increase the temperature in said cavity at a generally steady rate to within a predetermined temperature range of 220°–300° F.

10. A food processing oven as claimed in claim 9 wherein said control means includes first, second, and third contact means coupled between said first and second heating elements and said power source, and switch selector means for operating said contact means between open and closed conditions, said switch selector means being operable to a first position to close said first and second contact means and to open said third contact means, whereby said first and second heating element means are connected in parallel relation with said source for energization at said predetermined rated power output, and to a second position to open said first and second contact means and close said third contact means, whereby said first and second heating element means are connected in series relation with said power source for energization at 10–30 percent of said predetermined rated power output.

11. A food processing oven as claimed in claim 9 wherein the rated power output of said first and second heating element means is 800 and 400 watts, respectively.

12. A food processing oven as claimed in claim 11 wherein said 400-watt heating element means is mounted in the upper portion of said cooking cavity and wherein the 800-watt heating element means is mounted in the lower portion of said cooking cavity.

* * * * *